United States Patent [19]
Itou et al.

[11] Patent Number: 4,826,744
[45] Date of Patent: May 2, 1989

[54] ALKALINE STORAGE CELL

[75] Inventors: Tsukasa Itou; Ryuji Kawase, both of Sumoto; Yuji Morioka, Tuna; Masao Ichiba, Sumoto; Fumitugu Tachihara, Sumoto; Takashisa Awajitani, Sumoto, all of Japan

[73] Assignee: Sanyo Electric Co., Ltd., Moriguchi, Japan

[21] Appl. No.: 156,154

[22] Filed: Feb. 16, 1988

[30] Foreign Application Priority Data

| Feb. 17, 1987 | [JP] | Japan | 62-33903 |
| Mar. 19, 1987 | [JP] | Japan | 62-64737 |
| Apr. 2, 1987 | [JP] | Japan | 62-82028 |
| May 19, 1987 | [JP] | Japan | 62-122308 |
| Jun. 10, 1987 | [JP] | Japan | 62-144891 |
| Jul. 3, 1987 | [JP] | Japan | 62-167293 |
| Jul. 3, 1987 | [JP] | Japan | 62-167294 |

[51] Int. Cl.$^4$ .............................. H01M 10/24
[52] U.S. Cl. .......................... 429/206; 429/217; 429/222; 429/144
[58] Field of Search ............ 429/222, 215–217, 429/57, 94, 144, 206, 209

[56] References Cited

U.S. PATENT DOCUMENTS

| 4,529,672 | 7/1985 | Howard et al. | 429/217 X |
| 4,614,696 | 9/1986 | Ito et al. | 429/222 |

FOREIGN PATENT DOCUMENTS

| 58-32362 | 2/1983 | Japan | 429/222 |

Primary Examiner—Anthony Skapars
Attorney, Agent, or Firm—Armstrong, Nikaido, Marmelstein & Kubovcik

[57] ABSTRACT

A rechargeable alkaline cell. Main components of the cell includes a positive electrode, a negative electrode, a separator, and a hydrophobic polymer. The negative electrode includes a conductive support, an active material layer formed on the conductive support, and a conductive layer formed on the active material layer. The separator is disposed between the positive and negative electrodes and impregnated with an alkaline electrolyte. The hydrophobic polymer is disposed between the separator and conductive powder of the conductive layer to be out of contact with the active material layer.

24 Claims, 14 Drawing Sheets

ALKALINE STORAGE CELL

BACKGROUND OF THE INVENTION (1) Field of the Invention

The present invention relates to an alkaline storage cell employing a cadmium electrode as its negative electrode.

(2) Description of the Prior Art

An unsintered cadmium electrode such as of the paste type which requires a simple manufacturing process and low manufacturing cost is in wide industrial use as the cadmium electrode for nickel-cadmium cells and other enclosed alkaline storage cells. This type of cadmium electrode is fabricated by kneading an active material such as cadmium oxide powder or cadmium hydroxide powder with a binder to form a paste, coating or filling a conductive support with the paste, and then drying the paste. However, this type of cadmium electrode has the problem of low oxygen gas consumption capability and an internal pressure of the cell tending to rise. Various proposals have been made to solve this problem.

Proposal 1

The present inventors have proposed in U.S. Pat. No. 4,614,696 to coat a conductive support with a paste of an active material having cadmium oxide as its main component, coat the surface of the paste with a slurry prepared by dispersing carbon powder in an aqueous solution of a hydrophilic binder such as polyvinyl alcohol, and dry the slurry thereby forming a carbon powder layer having a conductivity. According to this proposal, the conductive carbon layer causes the active material on the surface of the cadmium electrode to be charged with priority when the cell is charged, which realizes an improvement in the rate of chemical oxygen gas consumption in accordance with the following formula (1):

$$2Cd + O_2 + 2H_2O \rightarrow 2Cd(OH)_2 \qquad (1)$$

This method, however, is not without a problem. Since a hydrophilic binder such as polyvinyl alcohol is used to form a conductive layer of carbon powder, the electrode surface tends to become wet and obstruct oxygen reaching the surface of the carbon powder layer. Particularly where a sufficient amount of electrolyte is secured in order to provide good cell characteristics, there arises the problem of low oxygen gas consumption capability compared with the case of employing a paste type cadmium electrode having undergone a electrochemical formation of electrode for converting cadmium hydroxide or cadmium oxide which is an active material into metallic cadmium. If an excess amount of electrolyte is provided, the electrolyte is present in film form on the surface of the cadmium electrode in an amount more than necessary to the oxygen gas consuming reaction. This is detrimental to the contact between oxygen gas and metallic cadmium, and the electrode has lower oxygen gas consumption capability particularly during initial charge and discharge cycles than the paste type electrode having undergone a electrochemical formation of electrode. The amount of electrolyte in the cell has the following relationship with oxygen gas consumption capability discharge characteristics, and cycle life, which gives rise to conflicting problems. That is, if the amount of electrolyte is reduced in order to improve oxygen gas consumption capability other characteristics are impaired. Conversely, if the amount of electrolyte is increased in order to improve the other characteristics, then oxygen gas consumption capability becomes lower.

Proposal 2

Various proposals have been made to improve the oxygen gas consumption capability by checking wetting of the electode surface through a hydrophobic treatment of the electrode surface. One of such proposals is disclosed in Japanese Patent Publication Kokai No. 57-96463.

According to this proposal, a hydrophilic binder is added to an active material having cadmium oxide powder as its main component to form a paste which is coated on a conductive support, dried, pressurized and thereafter impregnated with a dispersion of fluororesin. It attempts to improve the electrode strength as well as oxygen gas consumption capability by causing part of the fluororesin to permeate inwardly of the active material while most of the fluororesin remains on an outer layer of the active material. This method indeed improves oxygen gas consumption capability by rendering the electrode surface hydrophobic, but the mere pressurization of the active material layer leaves the electrode with a 50% porosity which is necessary and through which fluororesin penetrates. The penetrating fluororesin, because of its hydrophobic property and insulating property, tends to impair electrode reaction. Therefore, this proposal is hardly suited for practical purposes.

Proposal 3

Japanese Patent Publication Kokai No. 58-186161 discloses application of fluororesin powder to the surface of a electrode formed by coating an active material in paste form on a conductive support, and molding the electrode under pressure. An attempt is made through this process to improve oxygen gas consumption capability and discharge characteristics. However, fluororesin powder, especially unsintered fluororesin powder, has particles in cohesion to form secondary particles, thereby increasing particle sizes. If fluororesin powder in this state is applied and pressurized on the electrode surface, an insulating layer is formed on the electrode surface. This poses the problem of lowering reactivity of the active material.

Proposal 4

Japanese Patent Publication Kokai No. 54-109143 proposes to improve oxygen gas consumption capability and discharge characteristics by placing porous metal sheets in tight contact with a negative electrode on both sides thereof and forming metallic cadmium on the electrode surfaces through a electrochemical formation of electrode. With this method, the metallic cadmium formed on the electrode surfaces indeed realizes an improvement in the rate of chemical oxygen gas consumption inaccordance with the foregoing formula (1).

However, such a method is not without a problem also. Since a complex manufacturing process including the electrochemical formation of electrode is required, this method cannot avail itself of the advantageous features of the paste type method, namely a simple manufacturing process and low manufacturing cost. Where a sufficient amount of electrolyte is secured in order to promote cell characteristics, the electrolyte is present in film form on the surface of the electrode in an amount more than necesary to the oxygen gas consuming reaction. This is detrimental to the contact between oxygen gas and metallic cadmium, and there arises the problem of oxygen gas consumption particularly during initial charge and discharge cycles immediately after a cell is assembled. Thus, the cell must be provided with only a limited amount of electrolyte.

Proposal 5

Japanese Patent Publication Kokai No. 61-10857 proposes to promote discharge characteristics in high rate and at low temperature by improving the utilization rate of an active material. For this purpose the publication discloses a method comprising kneading cadmium oxide with a binder to form a paste, coating a conductive support with the paste, drying the paste, and then applying thereto a paste formed by kneading metallic cadmium with an aqueous solution of polyvinyl alcohol. This method is capable of forming metallic cadmium on the electrode surface without a electrochemical formation of electrode. However, as in the case of Proposals 1 and 4, where a sufficient amount of electrolyte is secured, the presence on the electrode surface of polyvinyl alcohol which is a hydrophilic binder causes the electrode surface to readily become wet to the detriment of the contact between oxygen gas and metallic cadmium. Thus, there is the problem of oxygen gas consumption particularly during initial charge and discharge cycles immediately after the cell assembly, wherefore the cell must be provided with only a limited amount of electrolyte.

SUMMARY OF THE INVENTION

The object of the present invention, therefore, is to improve the oxygen gas consumption capability of the alkaline cell without impairing the reactivity of the active material, thereby improving various characteristics of the cell, particularly high-rate charge characteristics and cycle life where the amount of electrolyte is increased.

The above object is achieved according to the present invention by a rechargeable alkaline cell comprising a positive electrode; a negative electrode including a conductive support, an active material layer of cadmium active material formed on the conductive support, and a conductive layer containing a binder and conductive powder and formed on the active material layer; a separator disposed between the positive electrode and the negative electrode and impregnated with an alkaline electrolyte; and a hydrophobic polymer disposed between the separator and the conductive powder of the conductive layer to be out of contact with the active material layer.

This object is achieved also by a rechargeable alkaline cell comprising a positive electrode; a negative electrode including a conductive support, an active material layer of cadmium active material formed on the conductive support, and a conductive layer containing a binder and conductive powder and formed on the active material layer, the conductive layer further containing a hydrophobic polymer; and a separator disposed between the positive electrode and the negative electrode and impregnated with an alkaline electrolyte.

The above object is achieved by these cells for the following reasons:

According to the above constructions, the electrode surfaces have both a proper hydrophilic property for contacting the electrolyte and a proper hydrophobic property for contacting oxygen gas at the same time. It is possible, therefore, to improve the oxygen gas consumption capability without impairing the reactivity of the active material. Presumably, with the cadmium electrode according to the present invention, the potential of the conductive layer comprising conductive powder approaches a reaction potential of cadmium and a reaction expressed by the following formula (2) takes place through contact between oxygen gas and the conductive powder (M):

$OH^-$ thus generated reacts with metallic cadmium as expressed in the following formula (3) and oxidized into cadmium hydroxide ($Cd(OH)_2$):

It is considered that three-phase surfaces of the conductive powder, water and oxygen are effectively formed in the constructions according to the present invention, namely by the conductive powder of the conductive layer formed on the electrode surfaces and the portions formed by the hydrophobic polymer to have a proper hydrophobic property for easy contact with oxygen gas. These three-phase surfaces are believed to cause, with great facility and speed, the reaction expressed in the formula (2) which is considered to represent a rate-determining step for an oxygen gas consuming reaction. Thus, the oxygen gas consuming reaction according to the formulas (2) and (3) is promoted.

Preferably, the hydrophobic polymer is distributed over surfaces of the conductive layer. This realizes numerous microscopic hydrophobic points of the hydrophobic polymer formed uniformly over the surfaces of the conductive layer comprising conductive powder and binder which promotes the above advantageous function.

The binder may be a hydrophilic binder. Where the conductive layer is formed by conductive powder and hydrophilic binder, a film of hydrophilic binder is present in the conductive layer. This film prevents the hydrophobic polymer from penetrating the conductive layer of conductive powder and hydrophilic binder into the layer of active material. The hydrophilic binder in the conductive layer allows the surfaces of the active material layer to retain a sufficient amount of electrolyte, and eliminates the problem of reduction in the electrolyte retention due to the entry of the hydrophobic polymer into the active material layer, thereby preventing reduction in the reactivity of the cadmium electrode.

The hydrophobic polymer may be sprayed to the surfaces of the conductive layer, whereby the hydrophobic polymer is distributed over the electrode surfaces efficiently and numerous hydrophobic points are formed uniformly by the hydrophobic polymer.

The hydrophobic polymer may comprise fluororesin, in particular particles of unsintered polytetrafluoroethylene. Unsintered polytetrafluoroethylene remains in fine particles without cohesion. Consequently, a thin layer including hydrophobic points of polytetrafluoroethylene distributed therein may readily be formed on the surfaces of the conductive layer comprising conductive powder and binder.

Further, the conductive powder may be bound with the hydrophobic polymer by heat treating the hydrophobic polymer and the conductive powder. This feature is believed to fulfill the foregoing object of the invention to a greater extent for the following reason.

Where the hydrophobic polymer contained in the conductive layer has not been heat treated, fine particles of the hydrophobic polymer are not in strong cohesion with conductive particles. Although the conductive layer has hydrophobic property as a whole, individual conductive particles are not very hydrophobic. On the other hand, where the conductive layer comprises conductive powder bound with the hydrophobic polymer through heat treating of the conductive particles and hydrophobic polymer, the hydrophobic polymer is in strong cohesion with the conductive particles. When viewed microscopically, individual conductive particles have a sufficient hydrophobic property and greatly facilitate the ionization of oxygen expressed in the foregoing formula (2).

The binder may comprise an organic or hydrophilic binder. In this case, the conductive layer is formed by conductive powder bound with the hydrophobic polymer through heat treatment of the hydrophobic polymer and conductive powder, and a binder which is hydrophilic or organic. Therefore, the conductive layer contains a film of the binder, the hydrophobic polymer is covered and cohering with conductive particles. The hydrophobic polymer comprising fluororesin, for example, is thus prevented from entering the active material layer and directly contacting the active material. As a result, the reduction in electrolyte retention due to entry to the active material layer of the hydrophobic polymer such as fluororesin is eliminated, thereby avoiding reduction in the reactivity of the cadmium electrode.

In an embodiment of the invention, fluororesin may be heat treated as a temperature above a melting point of fluororesin and below a complete sintering temperature of fluororesin. The resulting fluororesin is advantageous for the purpose of this invention. Where heat treatment is carried out at a temperature above the complete sintering temperature (polytetrafluoroethylene: 370° C.), the conductive particles bound with the fluororesin become larger through aggregation at the heat treatment. If these particles were used to form a conductive layer on the surfaces of the cadmium electrode, a delicate conductive network could not be formed by the conductive particles, thereby lowering the conductivity which is the intrinsic property of the conductive layer. It is then necessary to pulverize the aggregated particles to fine particles. Since completely sintered fluororesin no longer has flexibility, a pulverizing operation would cause part of the conductive particles in close cohesion with the sintered fluororesin to become separated from the fluororesin. When fluororesin is heat treated at a temperature between the melting point and the complete sintering temperature thereof, the fluororesin becomes dissolved once and then hardens into cohesion with the conductive powder. However, since the fluororesin does not become completely sintered, the fluororesin itself retains the flexibility to check the separation therefrom of the conductive powder at the time of pulverization. Consequently, a better oxygen gas consumption capability is realized by heat treating the fluororesin at a temperature between its melting point and complete sintering temperature than at a temperature above the complete sintering temperature.

The object of the invention is achieved also by an alkaline cell manufactured by a method comprising a first step of preparing a cadmium electrode by applying a past of cadmium active material to a conductive support; a second step of preparing a slurry by kneading a conductive powder, a hydrophobic polymer powder having a larger particle size than the conductive powder, and a binder; and a third step of applying the slurry to the cadmium electrode.

With the cell manufactured by the above method, the conductive layer includes fine particles of hydrophobic polymer. Therefore, numerous microscopic hydrophobic points may be formed uniformly in the conductive layer on the surface of the negative electrode. These hydrophobic points render a thin layer of the conductive powder on the negative electrode surfaces easily accessible to the oxygen gas generated from the positive electrode even if the cell contains an increased amount of electrolyte. As a result, the reaction expressed in formulas (2) and (3) takes place promptly.

The hydrophobic polymer has a larger particle size than the conductive powder and, where the slurry comprising the binder, conductive powder and hydrophobic polymer is coated on the surfaces of the cadmium electrode and dried, ultrafine particles of conductive powder inevitably are disposed to surround the hydrophobic polymer. As a result, the hydrophobic polymer does not contact the active material of the negative electrode and therefore does not impair the electrode reaction. According to the manufacturing method of the invention, when the conductive layer formed by applying coating the slurry thereon is dried, the drying process begins at the layer surfaces of the electrode, fixing large particles of the hydrophobic polymer first. Small particles of the conductive powder remain in suspension in the solvent, and do not readily become fixed. Ultimately a layer of conductive powder alone which hardly contains the hydrophobic polymer is formed between the layer of cadmium active material and the layer of conductive powder. This is considered the reason for being able to avoid the reduction in electrolyte retention due to entry to the active material layer of the hydrophobic polymer.

The negative electrode of the present invention has the conductive powder and hydrophobic polymer fixed thereto by the binder. Therefore, the conductive powder and hydrophobic polymer remain fixed to the surfaces of the negative electrode to maintain the oxygen gas consumption capability through repeated cycles of charging and discharging.

Further, fibrous matrices basically are not formed by orientation of fine particles of the hydrophobic polymer since the particles of the hydrophobic polymer are not subjected to a shearing force or the like.

The slurry may be applied to the cadmium electrode by a roller method or a spray method. These methods, unlike an immersion method, do not entail a possibility of falling of the active material.

With the cell according to the present invention, there is only a minor time lag between the generation of oxygen gas and the oxygen gas consuming reaction even during a rapid charging of 1-2C, which is effective to check an increase in the internal pressure of the cell. Further, the electrode reaction is not impaired since there occurs no direct contact between the active material and the fluororesin which is an insulating material. It is therefore possible to increase the amount of electrolyte without lowering the oxygen gas consumption capability, thereby to improve various characteristics of the cell, particularly high-rate charge characteristics and cycle life.

Other features and advantages of the invention will be appraent from the following description.

DESCRIPTION OF THE PREFERRED EMBODIMENTS

First embodiment

Figure 1:
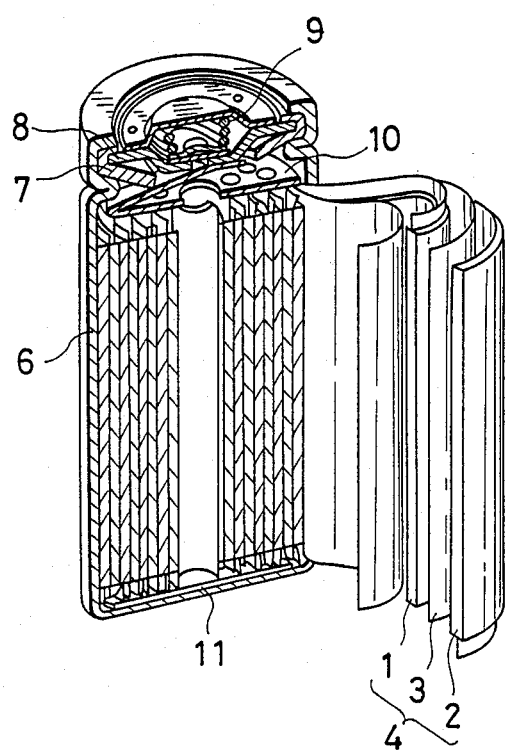
FIG. 1 is a view in vertical sectin of an alkaline cell embodying the present invention.

FIG. 1 shows a section of an alkaline storage cell comprising a positive electrode 1, a negative electrode 2 and a separator 3 disposed between the positive and negative electrodes 1 and 2, which constitute a group of electrodes 4 rolled together. An outer canister 6 defines an upper opening in which a sealing element 8 is mounted through a packing 7. The sealing element contains a coil spring 9. The coil spring 9 is compressed when an internal pressure of the cell rises to an abnormal degree, to release internal gas to the ambient. The sealing element 8 and positive electrode 1 are connected to each other by a collector 10, and the outer canister 6 and negative electrode 2 are connected to each other by a collector 11.

The above construction is employed not only for the first embodiment but for the second to fifth embodiments described later. The cell having this construction is fabricated as follows:

Preparation of Cadmium Electrode (Base Electrode X)

An active material paste was obtained by kneading 900 grams of cadmium oxide powder with 100 grams of metallic cadmium powder acting as an active material, 20 grams of magnesium oxide, 6 grams of hydroxypropyl cellulose acting as a binder, 10 grams of nylon fiber acting as a reinforcing agent, and 300 cc of a 5% aqueous solution of sodium phosphate. Then a cadmium plectrode was obtained by coating the paste on both surfaces of a conductive support comprising a punched metal, and drying the paste. This cadmium electrode was used as base electrode X.

Surfaces of the base electrode X were coated with a slurry obtained by kneading 100 parts by weight of water, 5 parts by weight of carbon powder (acetylene black) and 5 parts by weight of polyvinyl alcohol acting as a hydrophilic binder. The slurry was thereafter dried. Next, after removing oil films of low boiling point formed to prevent deposition through contact with air, the product was sprayed with Teflon 41-J (without surface active agent, manufactured by DuPont-MitSui Fluorochemicals Co., Ltd.) which was a hydrophobic polymer shaken and diluted with pure water to a concentration of 1/20 to 1/30. The product was the dried to realize a cadmium electrode $a_1$ according to the present invention.

COMPARATIVE EXAMPLES

A comparative electrode $a_2$ was obtained through the same manufacturing process as Embodiment 1 without spraying of the hydrophobic polymer. A comparative electrode $a_3$ was obtained through the same manufacturing process as Embodiment 1 except that the hydrophobic polymer was sprayed directly to the base elecrode X without forming a conductive layer with carbon powder and the hydrophilic binder.

These electrodes $a_1$, $a_2$ and $a_3$ were combined with a known nickel electrode(sintered type) with a separator therebetween to form an electrode assembly in a roll, respectively. SC-size cells having 1200 mAh nominal capacity thus fabricated are called herein cells A1, A2 and A3.

Experiment I

Figure 2:
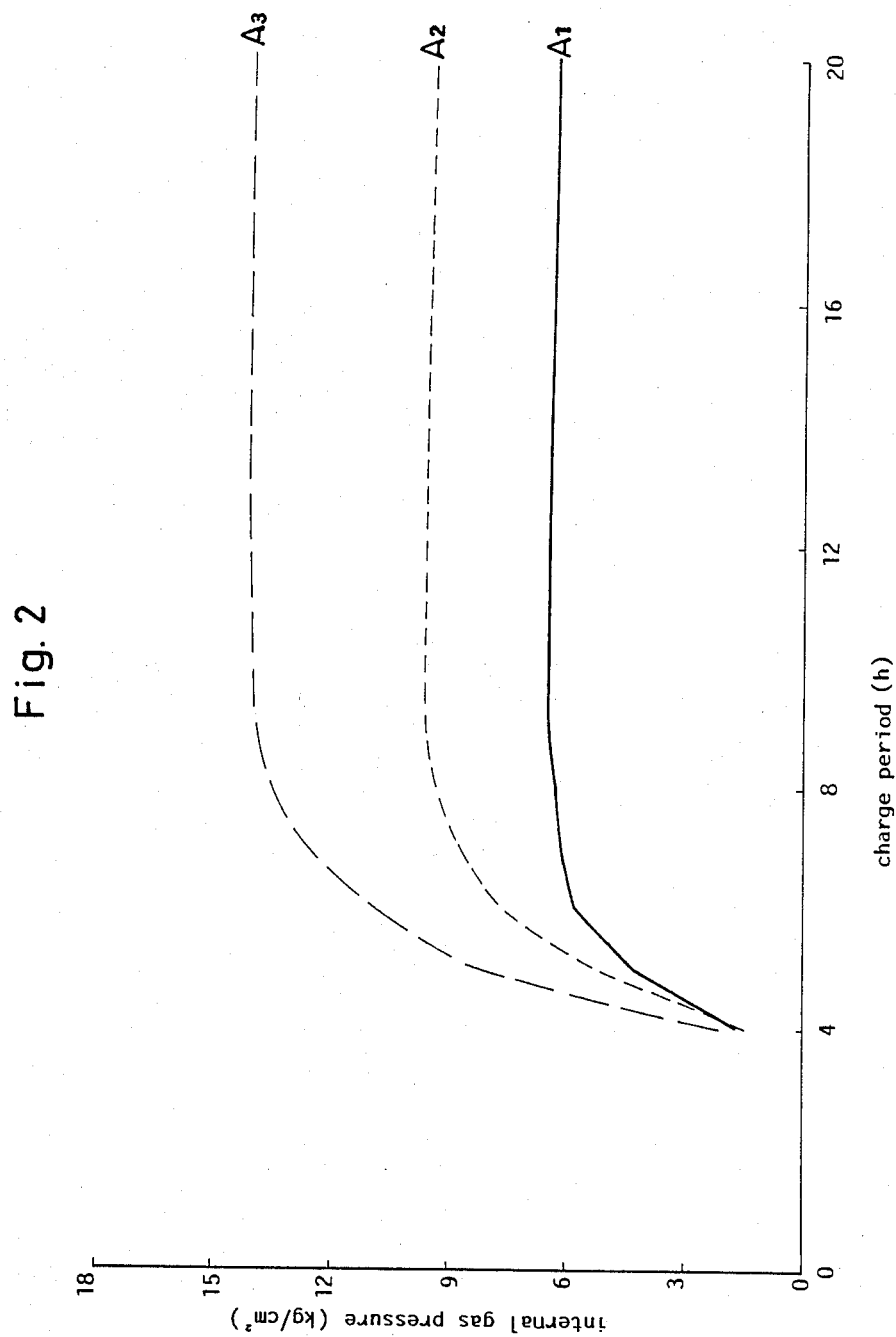
FIG. 2 is a graph showing a relationship between charge periods and internal gas pressures of cell A1 according to the present invention, comparative cell A2 and comparative cell A3.

Cells A1-A3 were continuously charged at room temperature with a current of 400 mA. FIG. 2 shows variations in the internal gas pressure of the cells at this time. It will be seen from these results that cell A1 according to the present invention has a very low internal gas pressure. This is because the electrode surfaces are given suitable hydrophobic property by contact with oxygen gas through the hydrophobic polymer, thereby promoting the chemical and electrochemical oxygen gas consuming reaction of the electrode surfaces. On the other hand, comparative cell A2 has a conductive layer comprising carbon powder and the hydrophilic binder but does not have a hydrophobic polymer providing the electrode with suitable hydrophobic points as in cell A1 according to the present invention. Consequently, comparative cell A2 is inferior in oxygen gas consumption capability. Comparative cell A3 is even less capable of oxygen gas consumption for lack of the conductive layer on the electrode surfaces.

Experiment II

Observations were made of cells A1 and A2 by varying the amount of electrolyte injected into the cells. This Experiment 2 has produced the following findings. First, internal gas pressures of cells A1 and A2 with the same amount of electrolyte were compared. Cell A1 according to the present invention had about half the gas pressure of comparative cell A2. When cells A1 and A2 were set to an equal internal gas pressure, cell A1 was able to accept the electrolyte in an amount 10-15% more than cell A2, whereby its discharge characteristics were improved by and large.

With regard to cycle life, it has been confirmed that cell A1 according to the present invention has a cycle life more than 1.5 times that of comparative cell A2. This is due to the increased amount of electrolyte which acts as a medium necessary to the electrode reaction. In other words, the elongated cycle life is made possible by the characteristic of electrode $a_1$ according to the present invention, namely excellent oxygen gas consumption capability.

Experiment III

Figure 3:
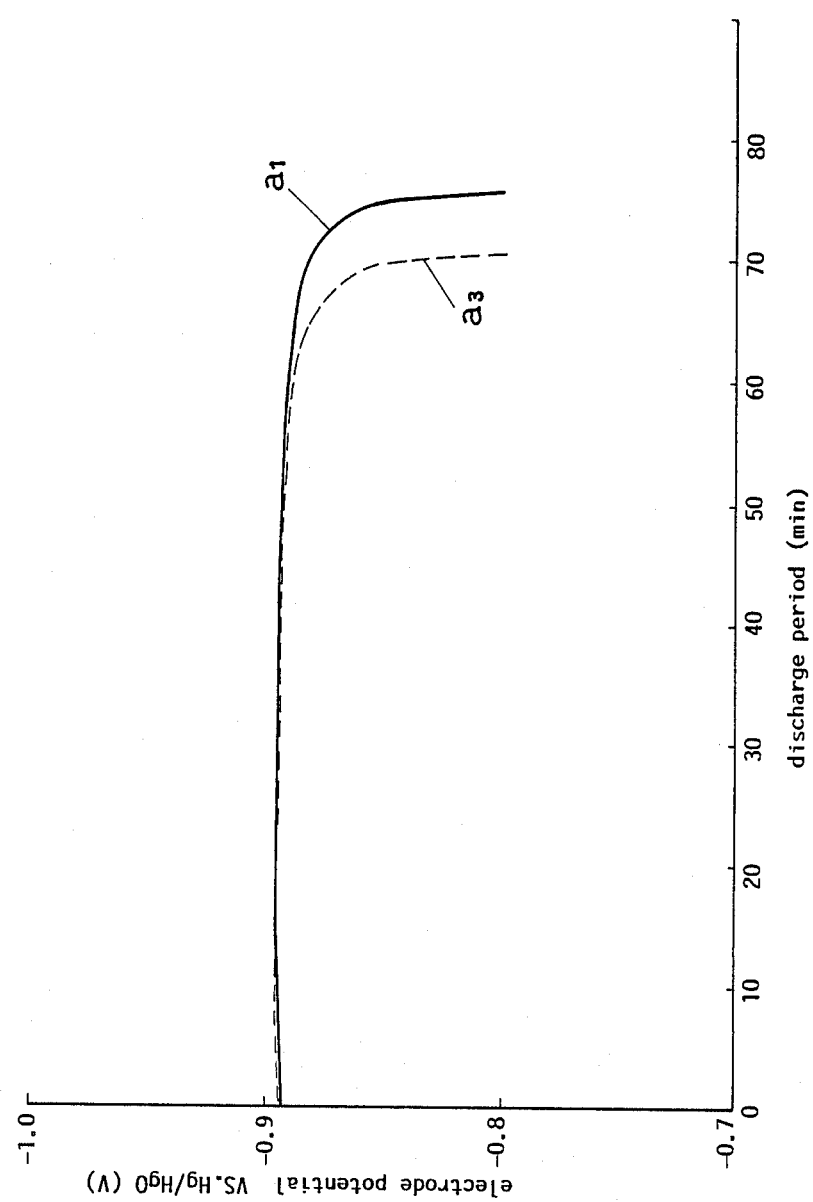
FIG. 3 is a graph showing a relationship between discharge periods and electrode potentials of an electrode $a_1$ of cell A1 according to the present invention and an electrode $a_3$ of comparative cell A3.

Electode $a_1$ and comparative electrode $a_3$ were charged at room temperature with a current of 1.2A for 90 minutes, and thereafter current was discharged in 1.2A. Results are shown in FIG. 3. In FIG. 3, the axis of abscissa represents discharge periods and the axis of ordinates represents potentials of the cadmium electrode with respect to reference electrode Hg/HgO. Compared with electrode $a_1$ according to the present invention, comparative electrode $a_3$ is considered to have a small discharge capacity because the electrode surfaces are covered with the hydrophobic polymer to have a small amount of electrolyte over the surfaces, which results in low reactivity in these regions.

The above results of the experiment have revealed the following facts:

(1) Where the hydrophobic polymer is distributed over the surfaces of the conductive layer comprising carbon powder and the hydrophilic binder, this hydrophobic polymer applied in only a small amount produces an excellent effect in the oxygen gas consuming reaction. This is exceedingly advantageous from the point of view of cell characteristics and cost.

(2) By spraying the hydrophobic polymer as in this embodiment, it is possible to prevent the active material from falling during this step and uniformly distribute a large number of hydrophobic points.

Water is used in this embodiment for dispersing polytetrafluoroethylene acting as the hydrophobic polymer, but the dispersion medium is not limited to water. For example, Neoflon (manufactured by Daikin Kogyo CO., LTD. Japan) may be used, which comprises xylene acting as dispersion medium and fine particles of polytetrafluoroethylene dispersed therein.

Second Embodiment

An active material paste was obtained by mixing 90 parts by weight of cadmium oxide and 10 parts by weight of metallic cadmium, the mixture being then added and kneaded with polyethylene fiber acting as a reinforcing agent, polyvinyl alcohol acting as a binding agent, and water. Then a cadmium electrode was obtained by coating the paste on both surfaces of a conductive support comprising a punched metal plate, and drying the paste. Surfaces of the cadmium electrode were coated with a slurry obtained by kneading 10 parts by weight of acetylene black which is carbon powder, 4 parts by weight of polyvinyl alcohol acting as a hydrophilic binder, and water. A cadmium electrode was thus obtained having a conductive layer of carbon powder. On the other hand, a dispersion of polytetrafluoroethylene (PTFE) in 1.0% by weight concentration was sprayed on one face of the separator comprising an unwoven cloth of nylon. This separator was placed with the face thereof carrying fluororesin opposed to the conductive layer of the cadmium electrode. These elements were combined with a known nickel positive electrode (sintered type) to form a spiral wound electrode assembly. A cell B1 according to the present invention was obtained, which has 1200 mAh nominal capacity.

COMPARATIVE EXAMPLES

A comparative cell B2, which was the same as cell B1 except use of a nylon separator not subjected to a hydrophobic treatment with fluororesin, was fabricated by using the cadmium electrode having a conductive layer of carbon powder as used in the above embodiment.

A comparative cell B3 was fabricated, which was the same as cell B1 except use of the cadmium electrode having no conductive layer of carbon powder as used in the above embodiment.

A further comparative cell B4 was fabricated, which was the same as cell B1 except use of a cadmium electrode having no conductive layer of carbon powder and use of a nylon separator not subjected to a hydrophobic treatment with fluororesin. Cells B1-B4 were charged at room temperature with a current of 1.5C for 60 minutes, and their interal pressures were measured. The following table shows the results.

|  | Electrode Surfaces with Conductive Layer of Carbon Powder | Separator Hydrophobic Treated with Fluororesin | Internal Pressure of Cells (kg/cm$^2$) |
| --- | --- | --- | --- |
| Cell B1 | yes | yes | 4 |
| Cell B2 | yes | no | 11 |
| Cell B3 | no | yes | 16 |
| Cell B4 | no | no | 25 |

It will be seen from these results that, compared with comparative cells B2–B4, cell B1 according to the present invention has a very low internal gas pressure. Cell B1 employs the separator having undergone a hydrophobic treatment with fluororesin, and the portion given a hydrophobic property through this treatment contacts the conductive layer of carbon powder. This forms three-phase surfaces, which is effective for oxygen gas consumption with a synergistic effect of a proper degree of hydrophobic property for contact with oxygen gas and a proper degree of hydrophilic property for contact with the electrolyte. The oxygen gas consumption is efficiently carried out by the conductive layer of carbon powder, thereby maintaining the low internal pressure of the cell.

Next, a comparative test of cycle characteristics was conducted on cell B1 of the present invention and comparative cell B2. This test was conducted under a rapid charging and discharging condition in which the cells were charged with a 1.5C current for 55 minutes and discharged with a 1C current to a discharge ending voltage of 1 V.

Figure 4:
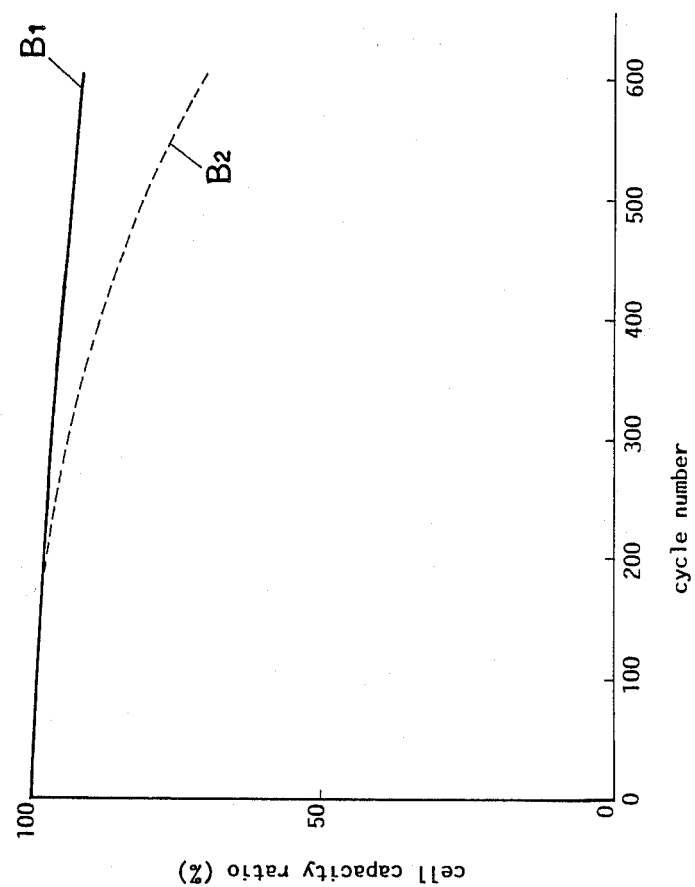
FIG. 4 is a graph showing a relationship between the number of cycles and cell capacity ratios of cell B1 according to the present invention and comparative cell B2.

The results are shown in FIG. 4. It will be seen from FIG. 4 that cell B1 of the present invention has a less cycle deterioration than comparative cell B2. As the number of cycles increases, comparative cell B2 has inactive metallic cadmium accumulating on the negative electrode, which impairs discharging. Since metallic cadmium has a greater specific gravity than cadmium hydroxide, an increased amount of pores remain on the negative electrode as a result of the change in the active agent. And the electrolyte moves from the separator to the negative electrode, hence a reduced amount of the electrolyte retained by the separator. This results in a dryout of the separator which increases the internal resistance. Consequently, the reduction in the comparative cell B2 capacity occurs as the number of cycles increases. Cell B1 of the present invention, on the other hand, has the separator including a hydrophobic portion formed of fluororesin on the face opposed to the negative electrode, which checks the movement of electrolyte from the separator to the negative electrode. The electrolyte retained by the separator of cell B1 reduces by a smaller amount than of cell B2. So, the number of cycles in cell B1 more increases than in cell B2. This feature provides cell B1 of the present invention with improved cycle characteristics.

The separator employed in the present invention, which has undergone a hydrophobic treatment with fluororesin, carries the fluororesin having permeated inside, though slightly, from the separator surface. The hydrophobic property of spaces in this portion is considered to retain oxygen gas, thereby promoting the oxygen gas consuming reaction of the negative electrode.

The fluororesin dispersion used in this embodiment has a concentration of 1.0% by weight, but the concentration may range from 0.5 to 3.0% by weight for the purposes of facilitating formation of the hydrophobic portions with fluororesin. The amount of fluororesin used should be 100 mg or less per cell (with a nominal capacity of 1200 mAH), preferably in the range of several milligrams to several tens of milligrams.

Further, in this embodiment the single separator has on a side thereof including a hydrophobic portion formed with fluororesin. However, the separator between the positive and negative electrodes may comprise two unwoven nylon cloths one of which is 200 microns thick and the other 50 microns thick, the thinner cloth being opposed to the negative electrode. In this case, the thinner cloth is immersed in the fluororesin dispersion to have the hydrophobic property. This composite separator produces the same effect as the separator employed in this embodiment.

Third Embodiment

A slurry comprising 100 parts by weight of water, 10 parts by weight of carbon powder (200°–300Å particle sizes), and 10 parts by weight of polyvinyl alcohol was modified by mixing it with 100 parts by weight of Teflon Dispersion 41-J (Manufactured by DuPont-Mitsui Fluorochemicals Co., Ltd.) (about 0.2 micrometers particle size) which had been diluted with pure water to a solution of 10% by weight. A negative electrode $c_1$ was obtained by coating the slurry on the surfaces of base electrode X and drying the slurry.

COMPARATIVE EXAMPLES

A comparative negative electrode $c_2$ was obtained by spraying Teflon Dispersion 41-J diluted with pure water to 2% by weight on the surfaces of base electrode X and drying the dispersion.

A comparative negative electrode $c_3$ was obtained by mixing 10 parts by weight of carbon powder with 100 parts by weight of Teflon Dispersion 41-J diluted with pure water to a solution 10% by weight, drying the mixture, applying a shearing force to the dried product to shape it into film form, and coating the film on the surfaces of the base electrode X.

A comparative negative electrode $c_4$ was obtained by coating base electrode X with a slurry comprising 100 parts by weight of water, 5 parts by weight of carbon powder and 5 parts by weight of polyvinyl alcohol, and drying the slurry.

A comparative negative electrode $c_5$ comprises base electrode X per se in an untreated state.

The paste type negative cadmium electrodes $c_1$ to $c_5$ obtained as above were combined and rolled with known positive nickel electrodes with separators therebetween, and placed in cell cases, respectively. SC-size enclosed nickel-cadmium storage cells having 1.3AH nominal capacity were thus fabricated, which are called herein cell C1 of the present invention and comparative cells C2 to C5.

Experiment I

Figure 5:
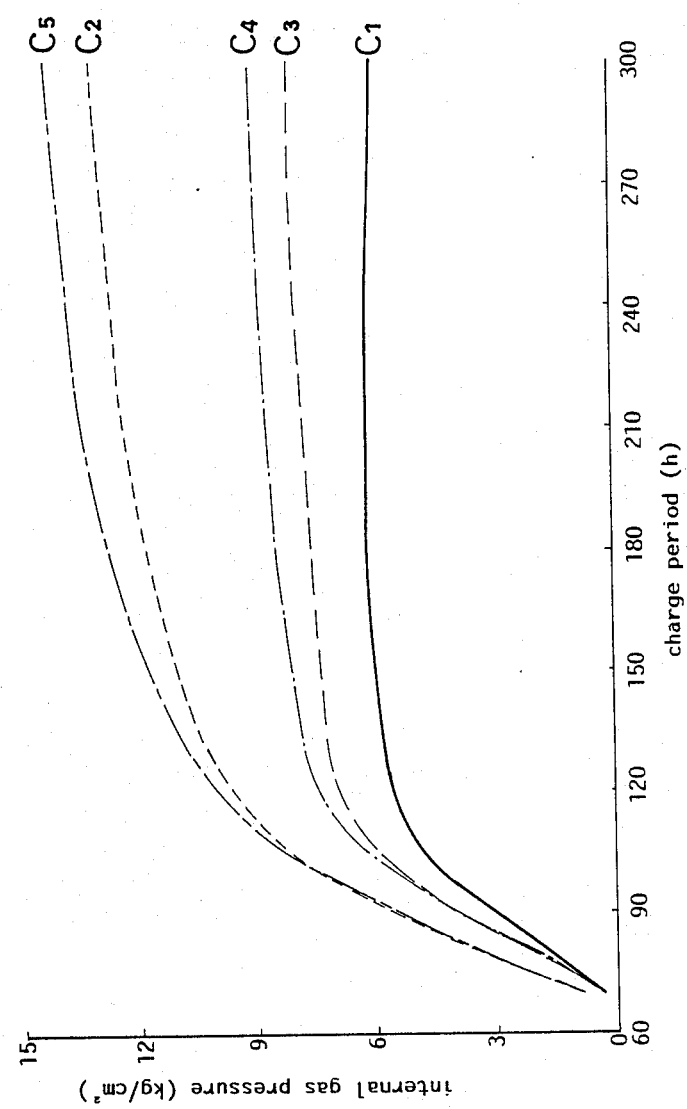
FIG. 5 is a graph showing a relationship between charge periods and internal gas pressures of cell C1 according to the present invention and comparative cells C2 to C5.

These cells C1–C5 were charged with a current of 1.3A (1C) at 25° C., and their internal pressures were compared. The results are shown in FIG. 5.

It will be seen that cell C1 of the present invention with the thin layer of carbon containing fluororesin has a very low internal pressure compared with the other cells. This is because numerous microscopic hydrophobic points are formed uniformly in the carbon layer on the negative electrode surface, which permit easy access to the oxygen gas generated from the positive electrode for its consumption.

Comparative cell C3 has fibrous matrices formed by orienting fine particles of fluororesin with the shearing force, but is inferior in gas consumption capability to cell C1 of the present invention. This is considered due to the fact that the area of the three-phase (solid-liquid-gas) surfaces formed by the hydrophobic property of fluororesin was reduced as a result of the fluororesin changing into the fibrillated state. This indicates that the fluororesin present in the form of fine particles is better suited than in the form of fibers for the purpose of oxygen gas consumption.

Experiment II

Figure 6:
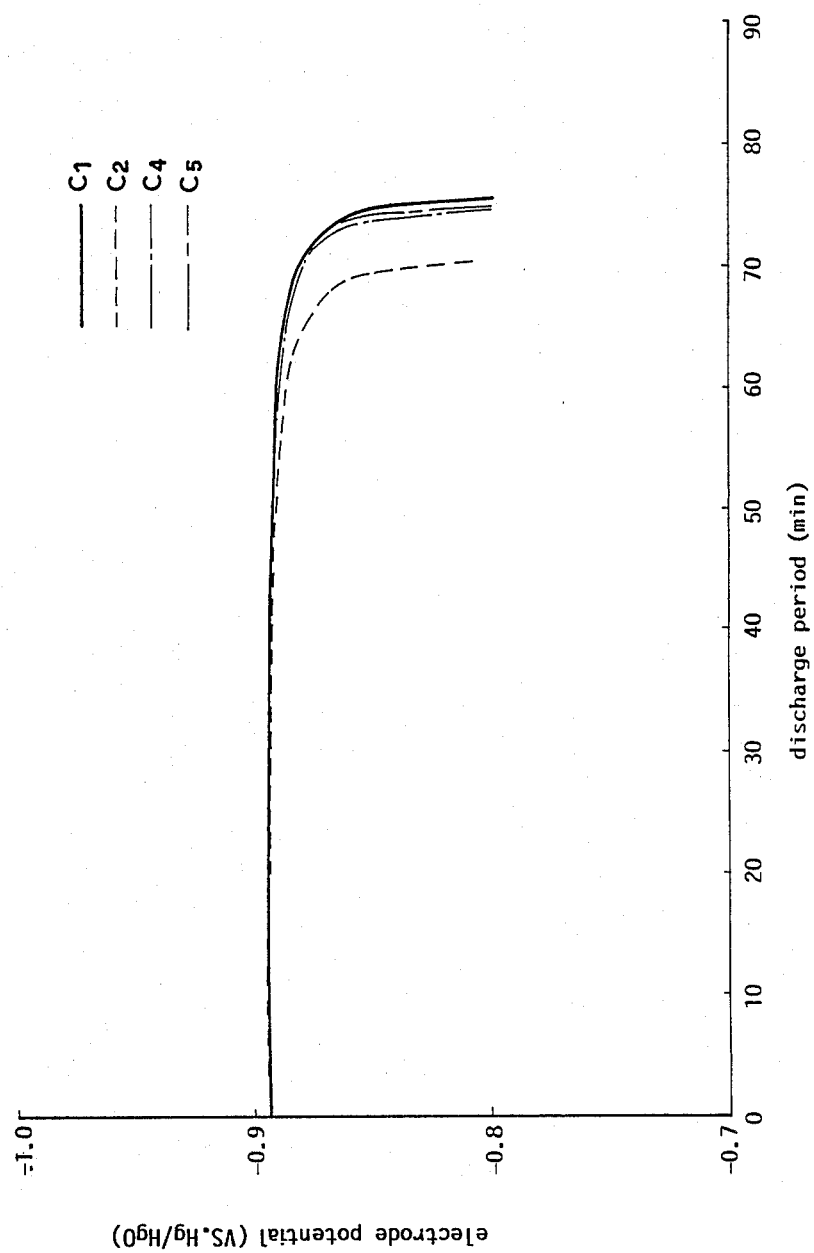
FIG. 6 is a graph showing a relationship between discharge periods and electrode potentials of an electrode $c_1$ of cell C1 according to the present invention and electrodes $c_2$, $c_4$ and $c_5$ of comparative cells C2, C4 and C5.

The negative electrodes $c_1$ to $c_5$ were compared in respect of discharge capacity by charging them with a 1.3A current at 25° C. for 90 minutes and thereafter discharging them with a 1.3A current. The results are shown in FIG. 6. It will be seen that comparative negative electrode $c_2$ has a small discharge capacity. The reason is considered to lie in that the electrode surfaces are covered with fluororesin which is an insulating material and these portions have a reduced reactivity. Negative electrode $c_1$ of the present invention, however, has ultrafine particles of carbon powder surrounding the fine particles of fluororesin to keep the latter out of contact with the active material of the negative electrode. Consequently, the reaction of the electrode is not impaired, thereby increasing the discharge capacity of the negative electrode.

It has been found through the above experiment that, since the film of carbon powder and fluororesin (i.e. carbon layer) may be formed by roller or spray coating instead of immersion, and there is no possibility of falling of the active material.

Fourth Embodiment

EXAMPLE I

A slurry comprising 100 parts by weight of water, 10 parts by weight of carbon powder, and 10 parts by weight of polyvinyl alcohol (hereinafter called slurry I) as modified by mixing it with 100 parts by weight of Teflon Dispersion 41-J (Manufactured by DuPont-Mitsui Fluorochemicals Co., Ltd.) which had been diluted with pure water to a solution of 10% by weight (hereinafter called slurry II).

A negative electrode $d_1$ was obtained by coating slurry I on the surfaces of base electrode X, drying slurry I, then coating slurry II thereon and drying it.

EXAMPLE II

A negative electrode $d_2$ was obtained by coating only slurry II on the surfaces of base electrode X and drying it.

COMPARATIVE EXAMPLES

A comparative negative electrode $d_3$ was obtained by coating only slurry I on the surfaces of base electrode X and drying it.

A comparative negative electrode $d_4$ was obtained by spraying Teflon Dispersion 41-J diluted with pure water to 2% by weight on the surfaces of base electrode X and drying the dispersion.

A comparative negative electrode $d_5$ comprises base electrode X per se in an untreated state.

The paste type negative cadmium electrodes $d_1$ to $d_5$ obtained as above were combined and rolled with known positive nickel electrodes with separators therebetween, and placed in cell cases, respectively. SC-size enclosed nickel-cadmium storage cells having 1.3AH nominal capacity were thus fabricated, which are called herein cells D1 and D2 of the present invention and comparative cells D3 to D5.

Experiment I

Figure 7:
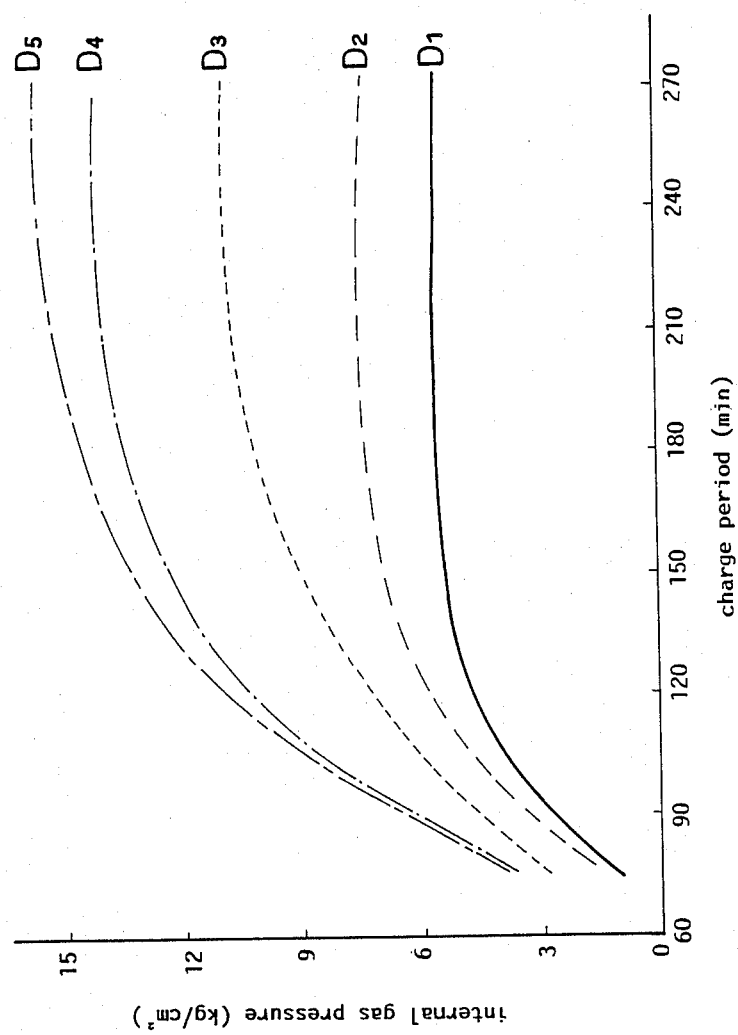
FIG. 7 is a graph showing a relationship between charge periods and internal gas pressures of cells D1 and D2 according to the present invention and comparative cells D3 to D5.
Figure 8:
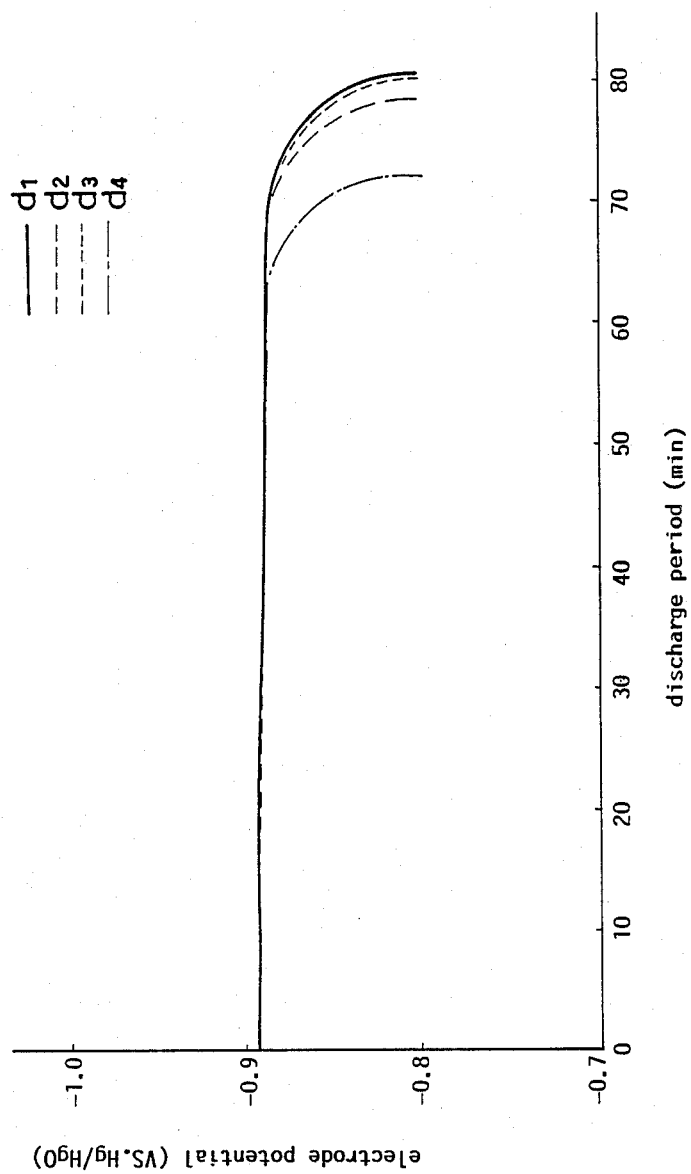
FIG. 8 is a graph showing a relationship between discharge periods and electrode potentials of electrodes $d_1$ and $d_2$ of cells D1 and D2 according to the present invention and electrodes $d_3$ and $d_4$ of comparative cells D3 and D4.

These cells D1–D5 were charged with a current of 1.3A (1C) at 25° C., and their internal pressures were compared. The results are shown in FIG. 7.

It will be seen that cells D1 and D2 of the present invention have very low internal pressures compared with the comparative cells. This is because numerous microscopic hydrophobic points are formed uniformly in the carbon layer on the negative electrode surface, and the carbon layer has an improved conductivity, which permit easy access to the oxygen gas generated from the positive electrode for its consumption. Cell D2 of the present invention has the negative electrode $d_2$ including a cadmium electrode carrying the fluororesin-containing carbon layer. This negative electrode $d_2$ has a lower conductivity than the negative electrode $d_1$ carrying a layer of carbon alone, which results in the difference in oxygen gas consumption capability.

Experiment II

The negative electrodes $d_1$ to $d_5$ were compared in respect of discharge capacity by charging them with a 1.3A current at 25° C. for 90 minutes and thereafter discharging them with 1.3A current. The results are shown in FIG. 3.

These results show that negative electrode $d_1$ of the present invention has a large discharge capacity. This is because negative electrode $d_1$ has, underneath the fluororesin-containing layer, the layer of carbon alone and not containing fluororesin which keeps the fluororesin out of contact with the active material of the negative electrode, whereby the reactivity of the electrode is not impaired.

The fluororesin is fixed by the binder to the surfaces of the negative electrode, and remains fixed in the layer through repeated charge and discharge cycles, to be able to maintain the oxygen gas consumption capability. Moreover, the fine particles of fluororesin are surrounded by ultrafine particles of carbon, and there is the layer of carbon particles. The fluororesin, therefore, does not contact the active material of the negative electrode and does not impair the reaction of the electrode.

Fifth Embodiment

EXAMPLE I 4 parts by weight of carbon powder dispersed in 100 parts by weight of Teflon Dispersion 30-J (Manufactured by DuPont-Mitsui Fluorochemicals Co., Ltd.) comprising polytetrafluoroethylene and diluted with pure water to 2% by weight were completely dried at 100°–120° C., and thereafter heat treated in nitrogen flows at 340° C. for 30 minutes. 3 parts by weight of this product pulverized into fine particles were dispersed in 100 parts by weight of a toluene solution of 2% by weight ethylene-vinyl acetate copolymer resin (which is an organic binder), to obtain a slurry. An electrode $e_1$ of the present invention was obtained by coating the slurry on the surfaces of base electrode X and drying the slurry.

EXAMPLE II

A cadmium electrode $e_2$ of the present invention was obtained by the same process as in Example I above except that the heat treatment was carried out at 370° C.

EXAMPLE III

A slurry was obtained by using 100 parts by weight of a solution of 5% by weight polyvinyl alcohol (which is a hydrophilic binder) instead of 100 parts by weight of the toluene solution of 2% by weight ethylene-vinyl acetate copolymer resin. An electrode $e_3$ of the present invention was obtained, which is the same as Example I except the use of this slurry.

EXAMPLE IV

An electrode $e_4$ of the present invention was obtained by the same process as in Example III except that the heat treatment was carried out at 370° C.

EXAMPLE V 10 parts by weight of carbon powder dispersed in 100 parts by weight of Lublon LD-100 (Manufactured by Daikin Kogyo CO., LTD.) which is an organic dispersion of polytetrafluoroethylene and which had been diluted with pure water to a solution of 2% by weight, were completely dried at 100°–120° C., and thereafter heat treated in nitrogen flows at 340° C. for 30 minutes. 15 parts by weight of this product pulverized into fine particles were dispersed in 100 parts by weight of a toluene solution of 2% by weight ethylene-vinyl acetate copolymer resin (which is an organic binder), to obtain a slurry. An electrode $e_5$ of the present invention was obtained by coating this slurry on the surfaces of base electrode X as in Example I.

EXAMPLE VI

An electrode $e_6$ of the present invention was obtained by the same process as in Example V except that base electrode X was coated with a slurry obtained by dispersing 15 parts by weight of pulverized fine particles of fluororesin and metallic cadmium powder in 100 parts by weight of a solution of 5% by weight polyvinyl alcohol (hydrophilic binder).

EXAMPLE VII

An electrode $e_7$ of the present invention was obtained by the same process as in Example V except that the heat treatment was carried out at 370° C.

EXAMPLE VIII

A slurry was obtained by mixing 100 parts by weight of Teflon Dispersion 30-J diluted with pure water to a 10% by weight solution, with a kneaded mixture of 100 parts by weight of water, 10 parts by weight of carbon powder, and 10 parts by weight of polyvinyl alcohol. An electrode $e_8$ of the present invention was obtained, which is the same as Example I except the use of this slurry. With electrode $e_8$, the hydrophobic polymer is unsintered and not heat treated.

EXAMPLE IX

A slurry was obtained by mixing 100 parts by weight of organic dispersion of polytetrafluoroethylene Lublon LD-100 (Manufactured by Daikin Kogyo Co., Ltd.) diluted with toluene to a solution of 4% by weight, with a kneaded mixture of 100 parts of weight of toluene, 10 parts by weight of carbon powder, and 4 parts by weight of ethylene-vinyl, acetate copolymer resin. A cadmium electrode $e_9$ of the present invention was obtained, which is the same as Example I except the use of this slurry. With electrode $e_9$, the hydrophobic polymer is unsintered and not heat treated.

EXAMPLE X

A slurry was obtained by mixing 100 parts by weight of organic dispersion of polytetrafluoroethylene Lublon LD-100 modified to a solution of 5% by weight, with a kneaded mixture of 100 parts by weight of toluene, 25 parts by weight of metallic cadmium powder, and 4 parts by weight of ethylene-vinyl acetate copolymer resin. An electrode $e_{10}$ of the present invention was obtained, which is the same as Example I except the use of this slurry. With electrode $e_{10}$, the hydrophobic polymer is unsintered and not heat treated.

COMPARATIVE EXAMPLE I

A comparative electrode $e_{11}$ was obtained by the same process as in Example I except that base electrode X was coated with a slurry obtained by kneading 100 parts by weight of water, 10 parts by weight of carbon powder and 5 parts by weight of polyvinyl alcohol.

COMPARATIVE EXAMPLE II

A comparative electrode $e_{12}$ was obtained by spraying Teflon Dispersion 30-J diluted with pure water to 2% by weight on the surfaces of the cadmium electrode used in Example I (which has no conductive layer on the active material surfaces), and drying the dispersion.

COMPARATIVE EXAMPLE III

A comparative electrode $e_{13}$ was obtained by the same process as in Example I except that base electrode X was coated with a slurry obtained by kneading 100 parts by weight of water, 12.5 parts by weight of metallic cadmium powder and 5 parts by weight of polyvinyl alcohol. This electrode corresponds to Proposal 5 noted hereinbefore.

COMPARATIVE EXAMPLE IV

A comparative electrode $e_{14}$ was obtained by spraying the organic dispersion of Teflon, Lublon LD-100, diluted with toluene to a solution of 2% by weight on the surfaces of the base electrode X used in Example I (which has not conductive layer on the active material surfaces), and drying the dispersion.

The paste type cadmium electrodes $e_1$ to $e_{14}$ obtained as above were combined and rolled with known positive nickel electrodes (sintered type) with separators therebetween to form spiral wound electrode assemblies, and placed in cell cases, respectively, and KOH electrolyte was injected into the cases. SC-size enclosed nickel-cadmium storage cells E1–E14 having 1.3 AH nominal capacity were thus fabricated. The following experiments were conducted on these cells.

Experiment I

Figure 10:
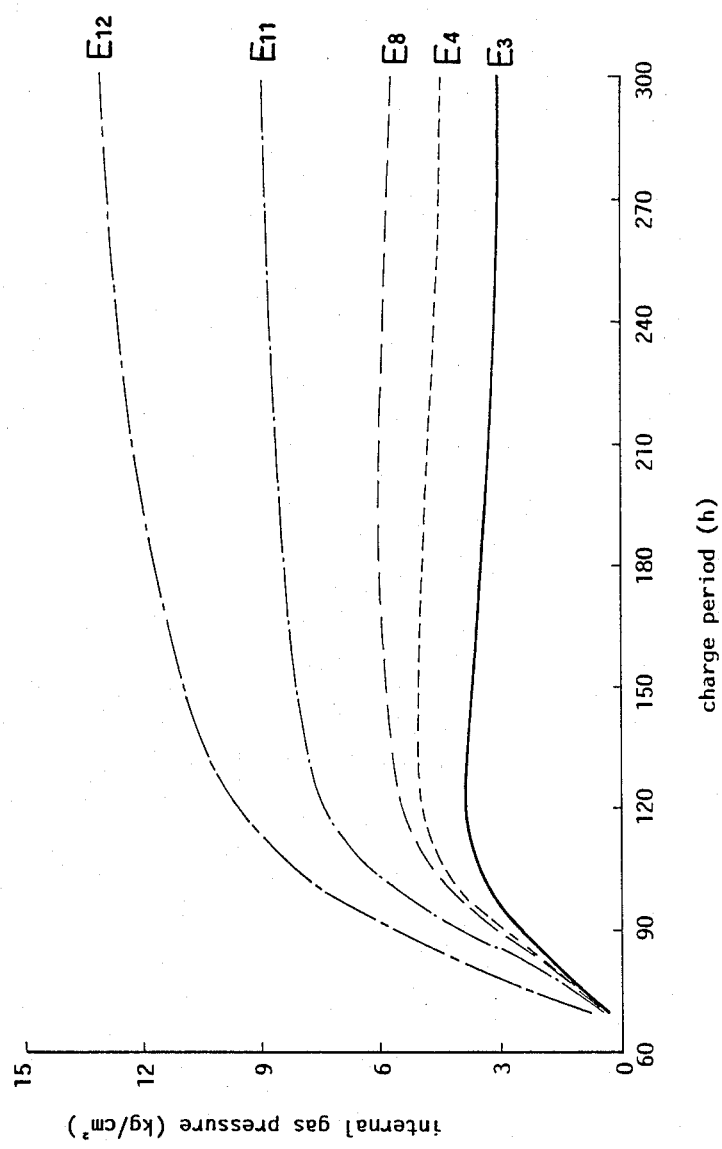
FIG. 10 is a graph showing a relationship between discharge periods and internal gas pressure of cells E3, E4 and E8 according to the present invention and comparative cells E11 and E12.
Figure 11:
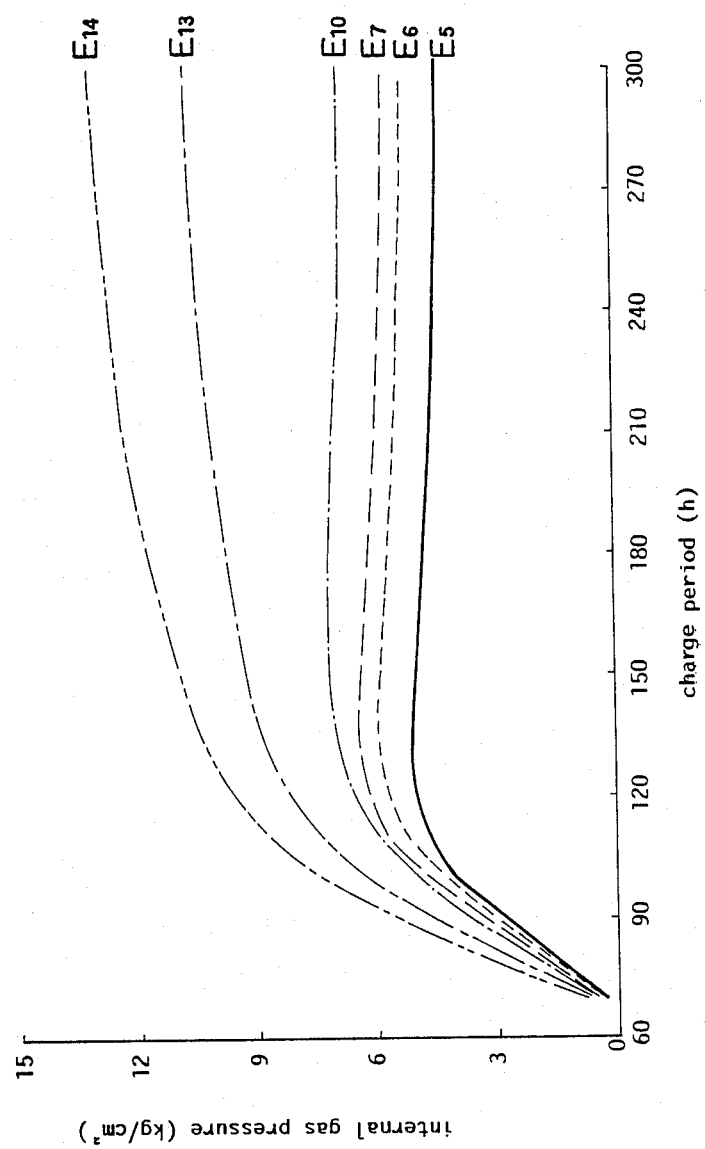
FIG. 11 is a graph showing a relationship between charge periods and internal gas pressures of cells E5, E6, and E7 and E10 according to the present invention and comparative cells E13 and E14.

Cells E1–E4 were charged with a current of 1.3A (1 C) at 25° C., and their internal pressures were compared. The results are shown in FIGS. 9 through 11.

It will be seen that cells E1–E10 of the present invention have lower internal pressures than comparative cells E11–E14. In particular, cells E1–E7 of the present invention, which employ conductive powder bound with hydrophobic polymer by heat treating the hydrophobic polymer and conductive particles, have lower internal pressure than cells E8–E10 of the present invention which employ the hydrophobic polymer and conductive particles simply added without heat treatment. This is due to the cohesion between the hydrophobic polymer comprising fluororesin and the conductive particles, and to the difference in hydrophobic property between the conductive powders per se, as noted hereinbefore.

Figure 9:
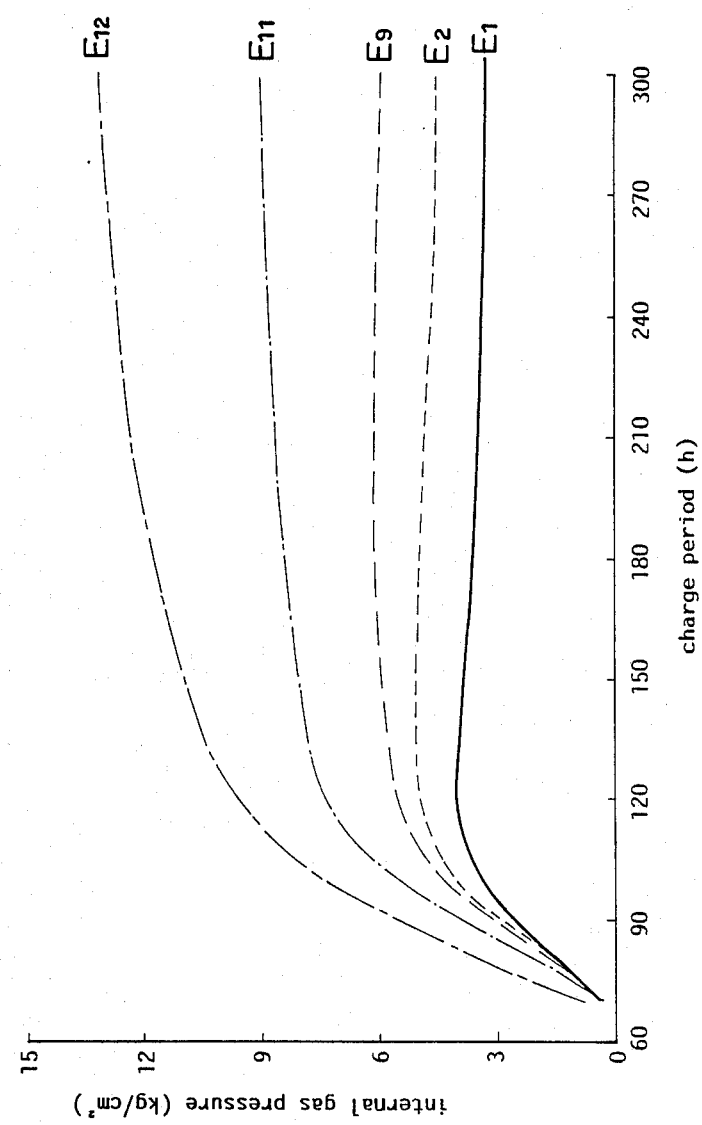
FIG. 9 is a graph showing a relationship between charge periods and internal gas pressures of cells E1, E2 and E9 according to the present invention and comparative cells E11 and E12.

Further, as seen in FIG. 9, cell E1 of the present invention, which includes conductive powder bound with fluororesin through a heat treatment carried out at a temperature below the complete sintering temperature of fluororesin, has a lower internal pressure than cell E2 of the present invention which includes conductive powder bound with fluororesin through a heat treatment carried out at a temperature exceeding the complete sintering temperature of fluororesin. This is because fluororesin has a reduced flexibility after the heat treatment carried out at a temperature exceeding the complete sintering temperature, whereby the conductive powder is prone to separate from the fluororesin through pulverization to follow. The same tendency is observed with cells E3 and E4 of the present invention as depicted in FIG. 10 and cells E5 and E7 of the present invention as depicted in FIG. 11.

Experiment II

Figure 12:
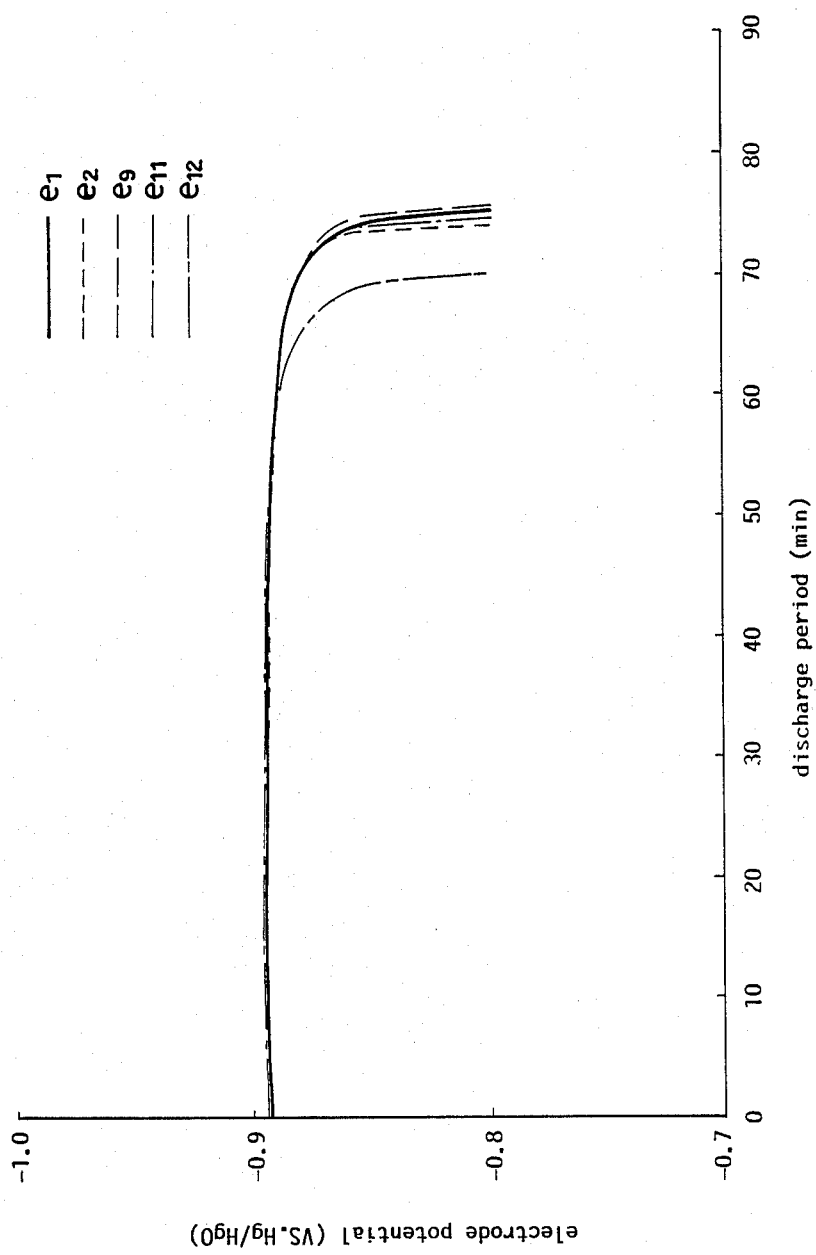
FIG. 12 is a graph showing a relationship between discharge periods and elecrode potentials of electrodes $e_1$, $e_2$, and $e_9$ of cells E1, E2, and E9 according to the present invention and electrodes $e_{11}$ and $e_{12}$ of comparative cells E11 and E12.
Figure 13:
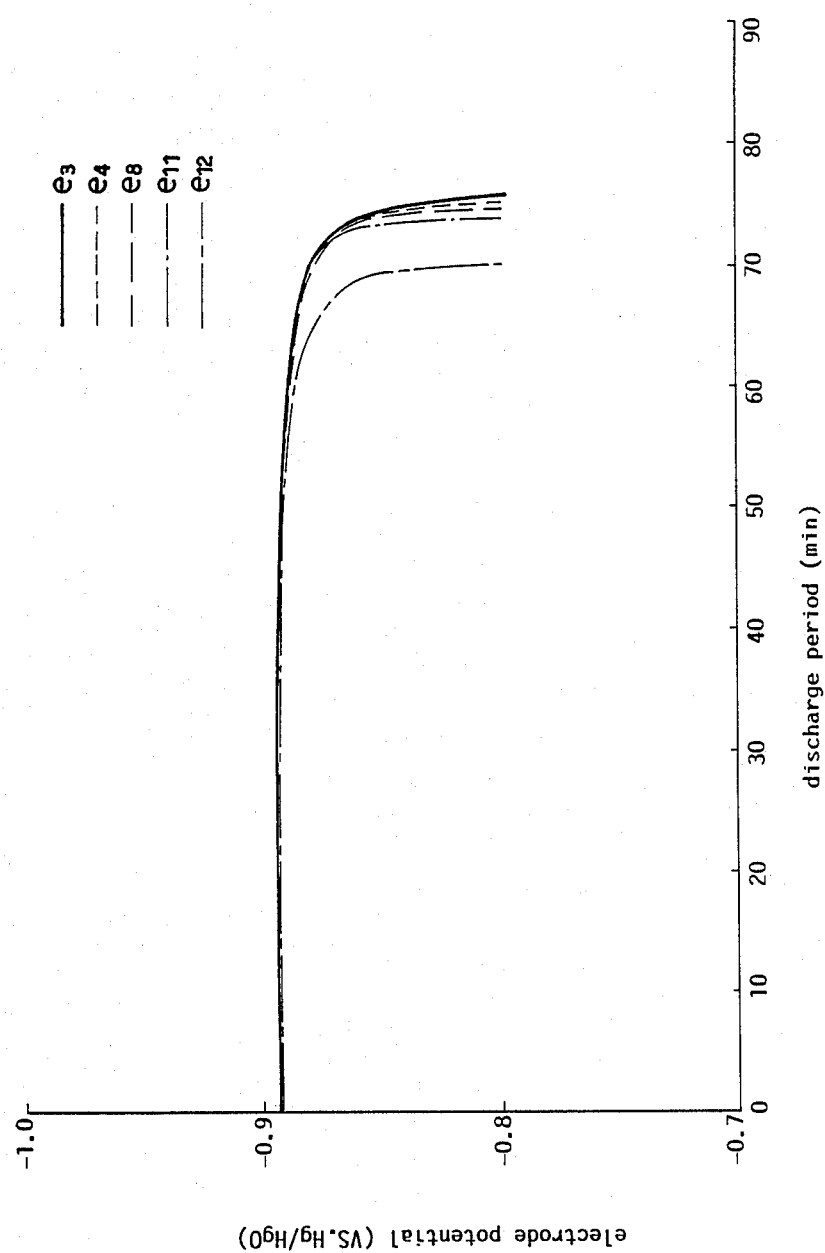
FIG. 13 is a graph showing a relationship between discharge periods and electrode potentials of electrodes $e_3$, $e_4$ and $e_8$ of cells E3, E4 and E8 according to the present invention and elecrodes $e_{11}$ and $e_{12}$ of comparative cells E11 and E12.
Figure 14:
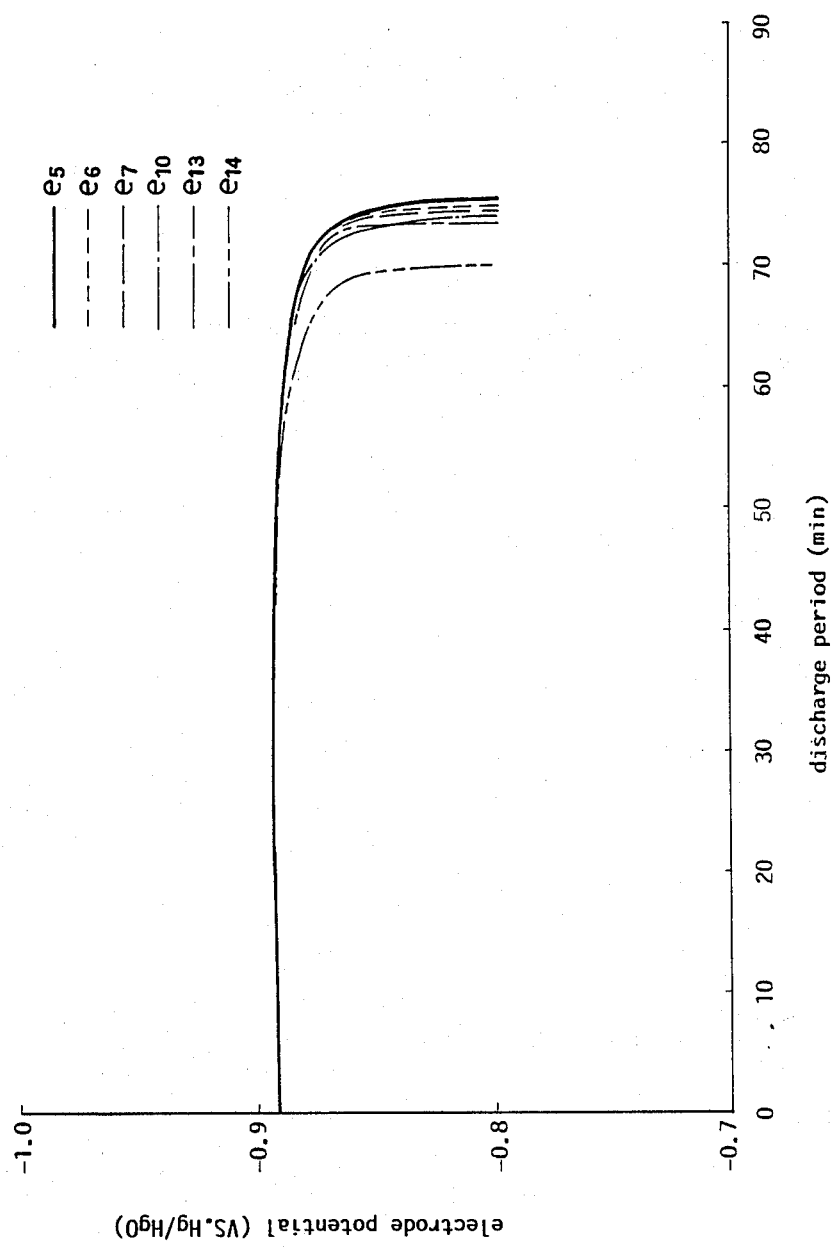
FIG. 14 is a graph showing a relationship between discharge periods and electrode potentials of electrodes $e_5$, $e_6$, $e_7$ and $e_{10}$ of cells E5, E6, E7, and E10 according to the present invention and electrodes $e_{13}$ and $e_{14}$ of comparative cells E13 and E14.

The electrodes $e_1$, $e_2$, $e_9$, $e_{11}$ and $e_{12}$ were compared in respect of discharge capacity by charging them with a 1.3A current at 25° C. for 90 minutes and therafter discharging them with a 1.3A current. The results are shown in FIG. 12. The axis of ordinates represent potentials of the cadmium electrodes with respect to a reference electrode Hg/HgO. Comparative electrode $e_{12}$ has a small discharge capacity because active material surfaces thereof are covered with fluororesin which is an insulating material and apparently these portions have a reduced reactivity. Electrodes $e_1$ and $e_2$ of the present invention, however, have conductive particles surrounding the fluororesin to keep the latter which is an insulating material out of contact with the active material of cadmium. Consequently, the reaction of the electrode is not impaired. This is true also of electrodes $e_3$ to $e_7$ of the present invention (see FIGS. 13 and 14).

The above experiment results show that, where a heat treatment has been effected on the hydrophobic polymer and conductive powder, the hydrophobic polymer is in strong cohesion with conductive particles, giving a sufficient hydrophobic property to the conductive powder. Consequently, ionization of oxygen takes place very actively on the conductive powder.

Where metallic cadmium is used as the conductive particles, metallic cadmium gradually changes into cadmium hydroxide as it undergoes charging and discharging repeatedly with an increase in the number of cycles, whereby its conductivity becomes lower. However, matrices of metallic cadmium in the active material layer increase with the progress of cycles. Further, the electrolyte content of the separator reduces as a result of expansion of the positive electrode (because the water retention of the positive electrode increases) occurring with the progress of cycles, which reduces the amount of electrolyte on the surfaces of the negative electrode. These developments are favorable to oxygen gas consumption, and therefore the use of metallic cadmium as the conductive particles poses no problem in practice.

However, carbon particles are preferable as the conductive particles where chemical stability is desired such as where the cell is intended for a very long period of use.

What is claimed is:

1. A rechargeable alkaline cell comprising;
   a positive electrode,
   a negative electrode including a conductive support, an active material layer of cadmium active material formed on the conductive support, and a conductive layer containing a binder and conductive powder and formed on the active material layer,
   a separator disposed between the positive electrode and the negative electrode and impregnated with an alkaline electrolyte, and
   a hydrophobic polymer disposed between the separator and the conductive powder of the conductive layer to be out of contact with the active material layer.

2. A cell as claimed in claim 1 wherein the hydrophobic polymer is distributed over surfaces of the conductive layer.

3. A cell as claimed in claim 1 wherein the hydrophobic polymer is carried by a surface of the separator placed in contact with the negative electrode.

4. A cell as claimed in claim 1 wherein the hydrophobic polymer comprises fluororesin.

5. A cell as claimed in claim 1 wherein the binder comprises a hydrophilic binder.

6. A cell as claimed in claim 1 wherein the conductive support comprises a punched metal.

7. A cell as claimed in claim 2 wherein the hydrophobic polymer is distributed by being sprayed to the surfaces of the conductive layer.

8. A cell as claimed in claim 3 wherein the fluororesin is carried by the surface of the separator by being applied thereto in a dispersion of 0.5 to 3.0% by weight concentration.

9. A cell as claimed in claim 3 wherein the separator includes at least two separator elements one of which is thinner than the other placed in contact with the positive electrode, the separator element placed in contact with the negative electrode carrying fluororesin.

10. A cell as claimed in claim 4 wherein the fluororesin comprises particles of unsintered polytetrafluoroethylene.

11. A cell as claimed in claim 5 wherein the hydrophilic binder is selected from a group consisting of polyvinyl alcohol, carboxymethyl cellulose, methyl cellulose, and hydropropyl cellulose.

12. A cell as claimed in claim 5 wherein the hydrophilic binder comprises polyvinyl alcohol.

13. A rechargeable alkaline cell comprising;
    a positive electrode,
    a negative electrode including a conductive support an active material layer of cadmium active material formed on the conductive support, and a conductive layer containing a binder and conductive powder and formed on the active material layer, the conductive layer further containing a hydrophobic polymer, and
    a separator disposed between the positive electrode and the negative electrode and impregnated with an alkaline electrolyte.

14. A cell as claimed in claim 13 wherein the conductive powder is bound with the hydrophobic polymer by heat treating the hydrophobic polymer and the conductive powder.

15. A cell as claimed in claim 13 wherein the binder comprises an organic binder.

16. A cell as claimed in claim 15 wherein the organic binder comprises ethylene-vinyl acetate copolymer resin.

17. A cell as claimed in claim 13 wehrein the binder comprises a hydrophilic binder.

18. A cell as claimed in claim 17 wherein the hydrophilic binder is selected from a group consisting of polyvinyl alcohol, carboxymethyl cellulose, methyl cellulose, and hydroxypropyl cellulose.

19. A cell as claimed in claim 17 wherein the hydrophilic binder comprises polyvinyl alcohol.

20. a cell as claimed in claim 13 wherein the conductive powder comprises carbon powder or metallic cadmium powder.

21. A cell as claimed in claim 14 wherein the hydrophobic polymer comprises fluororesin.

22. A cell as claimed in claim 21 wherein the fluororesin is heat treated at a temperature above a melting point of fluororesin.

23. A cell as claimed in claim 21 wherein the fluororesin is heat treated at a temperature below a complete sintering temperature of fluororesin.

24. A cell as claimed in claim 13 wherein the conductive support comprises a punched metal.

* * * * *

UNITED STATES PATENT AND TRADEMARK OFFICE
CERTIFICATE OF CORRECTION

PATENT NO. : 4,826,744

DATED : May 2, 1989

INVENTOR(S) : Itou et al

It is certified that error appears in the above-identified patent and that said Letters Patent is hereby corrected as shown below:

On the cover page, Item [75], line 4, "Takashisa Awajitani" should read --Takahisa Awajitani--.

Signed and Sealed this

Sixth Day of February, 1990

*Attest:*

JEFFREY M. SAMUELS

*Attesting Officer*     *Acting Commissioner of Patents and Trademarks*